March 15, 1960     L. W. BALLARD     2,928,114
DRILL PIPE WIPER
Filed Sept. 24, 1954
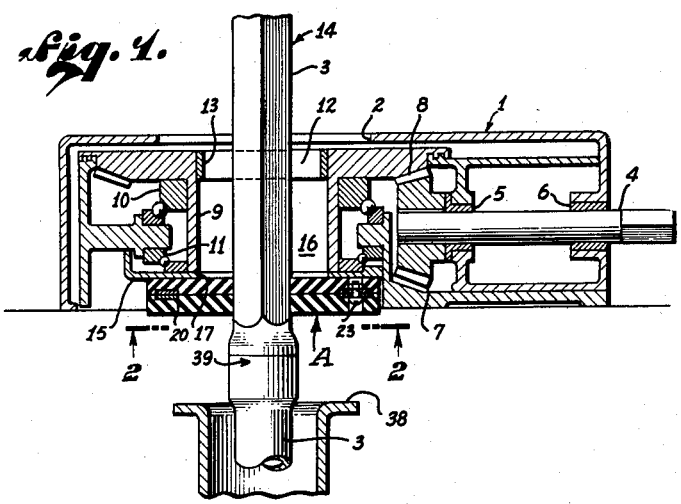
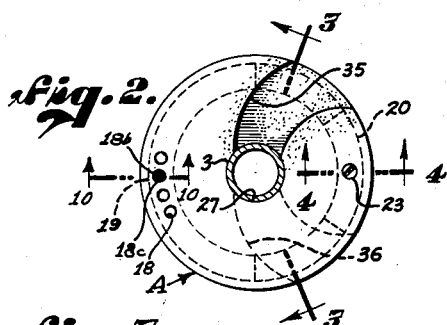
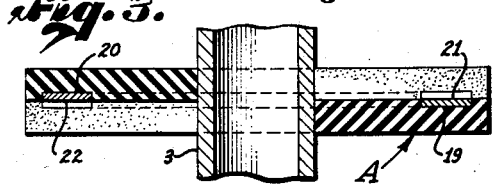
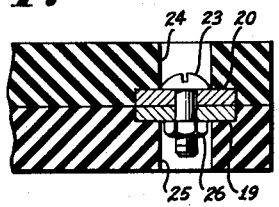
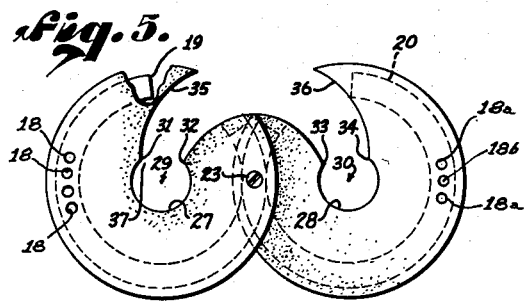
LESTER W. BALLARD,
INVENTOR.
BY *Lynn H. Latta*
ATTORNEY United States Patent Office 2,928,114
Patented Mar. 15, 1960

2,928,114

DRILL PIPE WIPER

Lester W. Ballard, Ventura, Calif.

Application September 24, 1954, Serial No. 458,120

6 Claims. (Cl. 15—210)

The invention relates to a pipe wiping device for use with apparatus for drilling oil wells.

The principal object of the invention is to provide a pipe wiper which may be installed onto the pipe from the side thereof and somewhere along the length of the pipe, the wiper after installation on the pipe serving to completely encircle the circumference of the pipe.

Another object of the invention is to provide a pipe wiper which may, after a long period of use, be repaired so as to be usable on a pipe of larger diameter.

Another object of the invention is to provide a pipe wiper which will function to deflect the drilling mud back into the well casing to prevent loss of same.

Other objects and advantages of the invention will be apparent from the ensuing specification and appended drawing in which:

Fig. 1 is a sectional view of a drilling apparatus with the pipe wiper associated therewith;

Fig. 2 is a sectional view of the drill pipe and wiper alone taken on the line 2—2 of Fig. 1;

Fig. 3 is an enlarged fragmentary sectional view of the pipe wiper of Fig. 1 taken on the line 3—3 of Fig. 2;

Fig. 4 is an enlarged fragmentary detail view taken generally on the line 4—4 of Fig. 2;

Fig. 5 is an underneath plan view of the pipe wiper in open position.

In the oil well drilling art it is customary to drill a hole into the ground to a depth sometimes of several thousand feet, the drilling of the hole being accomplished by utilizing numerous sections of tubular pipe, cylindrical in section, the pipe sections being connected together at intervals and having a cutting bit mounted on the lowermost or leading section. The cutting bit usually drills a hole which is considerably larger in diameter than the diameter of the pipe sections to which the bit is connected. A fluid, referred to in the trade as "mud" is usually pumped down through the interior of the sections of drill pipe, the fluid being expelled at the lowermost end of the leading section of drill pipe so as to lubricate the cutting bit. This fluid or "mud" after being expelled at the cutting bit is then forced under pressure back up through the drilled hole in the ground on the exterior of the string of drill pipes so as to form a cementing coating or lining which adheres to the wall of earth which is defined by the hole in the ground. Thus the exterior of these inter-connected sections of drill pipe are continuously submersed in this mud. Occasionally, it is necessary to withdraw one or more of the sections of drill pipe up out of the ground and in doing so it is desirable to utilize a wiping mechanism which will encircle the pipe and wipe the external surface thereof free of this mud as the pipe sections are withdrawn up out of the ground.

The pipe wiping device must be located beneath the rotary work table which is utilized to rotate the string of drill pipes so as to engage the under surface thereof as the sections of drill pipe are being withdrawn up through the rotary work table.

One form of construction of a rotary work table is shown in Fig. 1 and includes a housing 1 having a large opening 2 in its upper wall through which the drill pipe sections 3 extend. A power driven shaft 4 is journalled in appropriate bearings 5 and 6 for rotation relative thereto. A power unit (not shown) is utilized to drive the shaft 4 and the gear 7 is meshed with the gear 8 which has a hub portion 9 journalled in suitable anti-friction bearings 10 and 11 for rotation relative thereto. The central portion of the gear 8 has a large opening 12 therein through which the drill pipe sections extend and a suitable bushing (not shown) is installed within the interior of the sleeve 13 for gripping the uppermost or the driving section of drill pipe 14 to impart rotation thereto in the drilling operation. The section 14 is square shaped in cross section to provide gripping surfaces for the bushing which is inserted within the opening 12 to act against for imparting rotation to the string of drill pipes.

The present practice has been to employ a pipe wiper formed as a single disc of rubber, the disc being of considerably greater diameter than the diameter of the opening 12 so as to provide an adequate circumferential overhanging portion which will bear against the under surface of the plate 15 (as indicated in Fig. 1). The pipe wiper is of considerably greater diameter than the opening 12 and since it is a solid disc with an axial opening therein for encircling the drill pipe 3, it is necessary to install this type of pipe wiper at the end of the pipe 14 and then force the wiper axially along the length of the pipe 14 and literally ram it through the opening 12 (even though it is of larger diameter than such opening) and then continue to ram it through the interior 16 of the hub 9 until it is finally forced beyond the plate 15, after which (the pipe wiper being of rubber) it will assume its original disc shape and its circumferential portion will overhang the circumferential marginal portion of the plate 15 adjacent its opening 17. This solid type of pipe wiping disc becomes badly chewed and mutilated during the process of ramming it down through the sleeve 13 and the interior of the hub 9 and the pipe wiper seldom lasts very long and in replacing same, then it becomes necessary to insert a new pipe wiper onto the end of the pipe section 14 again.

The pipe wiper as shown in Figs. 1, 2, 3, 4 and 5 and indicated generally by the letter A contemplates the use of two separate circular discs which may be formed of rubber or some similar compressible and resilient material. The discs preferably have rigid reinforcing members of segmental shape embedded within their adjoining surfaces 21 and 22, these reinforcing members being designated by the numerals 19 and 20. The adjoining surfaces 21 and 22 lie in a common plane so that the discs may be rotated relative to each other and in face to face bearing contact, the reinforcing members riding against each other. The reinforcing members however serve the more important function of reinforcing the circumferential marginal portions of the discs to prolong the life thereof.

The two discs are anchored to each other by means of a removable pivot bolt 23 which extends through suitable openings 24 and 25 in the discs and through suitable openings in the reinforcing members. The nut 26 may be threaded onto the end of the pivot bolt 23 fairly tight but not such as to interfere with the manual swinging of the discs relative to each other about the axis of the bolt 23. The respective discs have central holes 27, 28 respectively therein, the walls of which form a partial circle generated from the axes 29 and 30 of the respective discs. The internal wall of each such hole extends considerably beyond 180 degrees terminating at 31 and 32 for hole 27 and at 33 and 34 for hole 28, the reason for which will be pointed out hereinafter.

From the termination points of the central holes in the respective discs arcuate slots 35, 36 are cut through the respective discs and open into the perimeters of said discs. Each of these slots is substantially generated from the axis of the pivot bolt 23 and the slot in each disc is preferably symmetrical with the slot in the other disc. In fact, the discs are preferably of identical construction for simplifying the manufacture thereof, one disc being turned over relative to the other disc when they are assembled together by means of the pivot bolt 23. Thus viewing Fig. 5 wherein the two discs are swung apart into open positions, the open ends of the arcuate slots are directed toward each other and the open end of one of the slots in one disc is introduced to the drill pipe from the side thereof and from underneath the work table 1.

The diameter of the central holes 27 and 28 of each disc being less than the outside diameter of the drill pipe 3 necessitates the use of some force in forcing the disc onto the pipe through the constricted mouth 37 of each slot. When one disc has been inserted onto the drill pipe 3, then it is only necessary to rotate the remaining disc about the axis of pivot bolt 23 and the open end of the slot in that disc will register with the slot in the other disc and continued rotation of the second disc will eventually cause same to be brought into complete registry with the first disc as shown in Fig. 2 wherein the internal walls of the central openings 27 and 28 will completely encircle the drill pipe (that is, each disc encircles more than 180 degrees of circumference of the drill pipe on a respective side thereof). Thus the two discs in conjunction with each other completely encircle the drill pipe and will wipe the exterior surface of same as the string of drill pipes are withdrawn up through the opening 12.

In order to complete the task of forcing the second disc into complete registry with the first disc in the position as shown in Fig. 2, I have provided a series of openings 18 in the upper disc, a fixed bolt 18b together with additional openings 18a in the lower disc. A long rod may be utilized to align the openings 18 and 18a by inserting same diagonally through one of the openings 18 until the end of the rod is guided into the nearest opening 18a in the lower disc and then the rod is used as a pry for forcing the second disc into complete registry with the first disc as shown in Fig. 2. The bolt 18b will then extend up through the appropriate opening 18 and the nut 18c may be threaded onto said bolt for locking the two discs in registry with each other about the drill pipe.

As the pipe sections are drawn up through the work table 1, the circumferential margins of the upper disc will engage the under surface of the plate 15 and as the string of drill pipes are again lowered into the ground, the lower disc will engage the upper end of the well casing 38.

Referring to Fig. 5 wherein it has been pointed out that the central holes 27 and 28 extend throughout more than a 180 degree arc, these central holes may then be enlarged to a greater diameter after a considerable period of wear so as to accommodate drill pipes of larger diameter. For example, the initial size of the central openings in the discs may be about 3⅛ inches in diameter for use on a 3½ inch O.D. pipe and then these openings may be enlarged to 4⅛ inches in diameter for use on 4½ inch O.D. pipe. The extra holes 18 in the upper disc will permit the bolt 18b to be advanced a hole when wear in the openings 27 and 28 necessitate such action thereby prolonging the life of the wiper assembly. It will be noted that where the sections of drill pipe are connected together (as indicated in Fig. 1 at 39), a joint results which is of greater diameter than the diameter of the drill pipe, however, since the pipe wiping discs are made of rubber or some similar material, the openings 27 and 28 will give sufficiently as to permit the joints 39 to be withdrawn therethrough.

I claim:

1. A pipe wiper comprising: a plate formed of compressible resilient material; a second plate formed of compressible material and mounted in face to face fashion with the first plate; a pivotal connection member for connecting one plate to the second plate, said pivotal connection being near the margins of the plates; each plate having an arcuate slot opening into its periphery, each of said slots being generated from a substantially common radius having its axis at the axis of the pivotal connection, whereby the slots are in substantial registry when the plates are revolved relative to each other about the axis of the pivotal connection, each slot having at its inner end a preformed wall, normally form retaining but yieldable under compression, of generally semi-circular shape, having a diameter substantially the same as and not greater than the diameter of a pipe to be wiped, for snug wiping engagement with a pipe to be wiped.

2. A pipe wiper as set forth in claim 1 including a reinforcing rib embedded in each plate near the outer margin thereof, each rib being in the form of a flat split ring and terminating short of the side edges of the slot of its respective plate.

3. A pipe wiper as set forth in claim 1 wherein said generally semicircular wall at the inner end of each slot exceeds 180 degrees and the span of each slot near the inner end thereof is of lesser distance than the span of each slot in the region where each slot opens into the plate periphery.

4. A pipe wiper as set forth in claim 1, including a reinforcing rib of split flat ring form, embedded in each plate along the outer margin thereof, with a substantial width of the material of the respective plate projecting radially inwardly from the rib to provide a yielding body defining the respective generally semi-circular wiping wall.

5. A pipe wiper as set forth in claim 1, including a reinforcing rib of split flat ring form, embedded in each plate along the outer margin thereof, with a substantial width of the material of the respective plate projecting radially inwardly from the rib to provide a yielding body defining the respective generally semi-circular wiping wall, and with the reinforcing ribs being exposed at adjoining faces of the plates and in direct contact with and overlapping one another at adjoining ends and connected by a pivot providing the pivotal connection between said plates.

6. A wiper for an oil well pipe comprising: a pair of plate members of arcuate configuration having respective free circumferential end portions normally in adjoining axially separated, circumferentially overlapping relation but adapted to be spread apart to define a gap to receive a pipe to be wiped, for installation of the wiper upon or removal of the wiper from said pipe, and having other end portions at respective circumferential extremities remote from said free end portions; means flexibly joining said other end portions to one another in a manner to accommodate said spreading action; each of said plate members comprising a body portion of resilient compressible material of rectangular cross section, elongated in the radial direction with reference to the axis of the wiper, and reinforcing rib means in each of said compressible body portions, said rib means being of flat arcuate strip form of less thickness than said compressible body portions adjacent the periphery thereof and extending radially inwardly only a portion of the radial width of the respective compressible body portion, whereby a substantial width of the latter projects radially inwardly from the inner margin of the respective reinforcing rib means to provide a yielding body defining, in the two plate members, a circular wiping wall extending more than 360° and having a diameter substantially the same as and not greater than the diameter of the pipe to be wiped, for snug wiping engagement therewith.

References Cited in the file of this patent

UNITED STATES PATENTS

| 778,591 | Layne | Dec. 27, 1904 |
|---|---|---|
| 1,641,921 | Crowell | Sept. 6, 1927 |
| 1,692,302 | Hessemer | Nov. 20, 1928 |
| 2,126,671 | Slaugenhop | Aug. 9, 1938 |
| 2,421,564 | Kleiderlein | June 3, 1947 |
| 2,548,127 | Slavens | Apr. 10, 1951 |